United States Patent
Wagner et al.

(10) Patent No.: US 9,792,256 B2
(45) Date of Patent: Oct. 17, 2017

(54) METHOD AND DEVICE FOR MONITORING AN ACTUATOR SYSTEM

(71) Applicant: Robert Bosch GmbH, Stuttgart (DE)

(72) Inventors: Alexandre Wagner, Stuttgart (DE); Ralf Buehrle, Hochberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 600 days.

(21) Appl. No.: 13/906,954

(22) Filed: May 31, 2013

(65) Prior Publication Data

US 2013/0325421 A1    Dec. 5, 2013

(30) Foreign Application Priority Data

Jun. 4, 2012 (DE) .................. 10 2012 209 387

(51) Int. Cl.
| | |
|---|---|
| *G06F 17/50* | (2006.01) |
| *G06F 17/13* | (2006.01) |
| *G05B 23/02* | (2006.01) |

(52) U.S. Cl.
CPC ......... *G06F 17/13* (2013.01); *G05B 23/0254* (2013.01)

(58) Field of Classification Search
CPC .... F02B 37/186; F02D 11/105; F02D 11/107; F02D 2009/0261; F02D 2009/0277; F02D 2011/102; F02D 2041/1431; F02D 2041/2072; F02D 2200/0402; F02D 2200/0404; F02D 2200/0408; F02D 2200/1012; G06F 17/13; G05B 23/0254

USPC ................................................ 703/2
See application file for complete search history.

(56) References Cited

U.S. PATENT DOCUMENTS

| | | | |
|---|---|---|---|
| 6,470,300 B1* | 10/2002 | Benzinger | G05B 9/02 702/183 |
| 6,687,585 B1* | 2/2004 | Rizzoni | B60G 17/0185 701/34.3 |
| 2003/0028262 A1 | 2/2003 | Yasui et al. | |
| 2010/0162993 A1* | 7/2010 | Yoshikawa | F02D 11/105 123/337 |

OTHER PUBLICATIONS

Gajic (Modern Control Systems Engineering, Prentice-Hall international series in systems and control engineering, 1996, ISBN 013141162).*

(Continued)

*Primary Examiner* — Kamini S Shah
*Assistant Examiner* — Brian S Cook
(74) *Attorney, Agent, or Firm* — Norton Rose Fulbright US LLP; Gerard Messina (57) ABSTRACT

A method for monitoring an actuator in a physical system, including: providing a computer model that describes the actuator, the behavior of the actuator being represented by a computer model function and by one or more parameters of the computer model function; determining or adapting the values of the parameters of the computer model with the aid of one or more particular system quantities; determining an error when a specified error condition is fulfilled, the error condition defining when at least one of the parameters, and/or at least one quantity determined from a plurality of the parameters, lies outside a corresponding specified target deviation range for the relevant parameter or the relevant quantity.

16 Claims, 2 Drawing Sheets

(56) References Cited

OTHER PUBLICATIONS

Luenberger, D., "Observing the state of a linear system," IEEE Transactions on Military Electronics, vol. 8, 74-80, 1964 teaches observer systems.*

Luenberger, D., "Observers for multivariable systems," IEEE Transactions on Automatic Control, vol. AC-11, 190-197, 1966 teaches observer systems.*

Luenberger, D., "An introduction to observers," IEEE Transactions on Automatic Control, vol. AC-16, 595-602, 1971 teaches observer systems.*

Recursion Defined Webster's II New Riverside University Dictionary, 1984, Houghton Mifflin Company.*

Heyneman_2006 (The Role of Textbooks in a Modern System of Education: Towards High Quality Education for All, 2006).*

Jiang_2011 (Sensor Fault Detection and Isolation Using System Dynamics Identification Techniques, Dissertation, University of Michigan, 2011).*

Boyd, S., Linear Controller Design: Limits of Performance, Prentice-Call, 1991.*

Isermann, R., Process Fault Detection Based on Modeling and Estimation Methods—A Survey, Automatica, vol. 20, No. 4, pp. 387-404, 1984.*

Tasi_2010 (Detecting Solenoid Valve Deterioration in In-Use Electronic Diesel Fuel Injection Control Systems, Sensors, 2010).*

Haugen_2003 (Haugen, F., Tutorial for Control System Toolbox for MATLAB, TechTeach, Oct. 11, 2003 downloaded from http://techteach.no/publications/control_system_toolbox/).*

Hmansour_2012.pdf, Solenoids, Sensors Actuators Interfaces Communication Tutorials References, dated Mar. 29, 2012 downloaded from http://www.sensorwiki.org/doku.php/actuators/solenoid.*

Spring_Constant_Def_2010.pdf downloaded from http://web.archive.org/web/20100602011257/http://www.anselm.edu/internet/physics/cbph.*

Santosh_2008.pdf Santosh, V.A., Hydraulic Solenoid Valve Reliability and Modeling Study, Thesis, Auburn Alabama, Dec. 19, 2008.*

Rohan_2007.pdf C2d: Functional Reference dated Sep. 17, 2007 downloaded from http://web.archive.org/web/20070917051022/http://www-rohan.sdsu.edu/doc/matlab/toolbox*

ME4710_2012.pdf ME 4710 Motion and Control: Continuous and Equivalent Discrete Transfer Functions.*

Gorinevsky_2005.pdf EE 392m—Spring 2005: Lecture 5—Sampled Time Control.*

* cited by examiner

METHOD AND DEVICE FOR MONITORING AN ACTUATOR SYSTEM

RELATED APPLICATION INFORMATION

The present application claims priority to and the benefit of German patent application no. 10 2012 209387.7, which was filed in Germany on Jun. 4, 2012, the disclosure of which is incorporated herein by reference.

FIELD OF THE INVENTION

The present invention relates to actuator systems, in particular to methods for monitoring the functioning of actuator systems.

BACKGROUND INFORMATION

Actuator systems are standardly monitored using signal-range check methods, or by the evaluation of target/actual deviation, or by plausibility monitoring by the computer models that represent the actuator system. These methods are well-suited for finding clearly recognizable errors in the functioning of the actuator system. However, these methods are often inadequate for discovering creeping errors such as slowly increasing friction or a slowly developing short circuit in a part of an actuator.

SUMMARY OF THE INVENTION

According to the exemplary embodiments and/or exemplary methods of the present invention, a method is provided for monitoring an actuator system according to the description herein, and the device, the computer program, and the computer program product according to the coordinate claims are provided.

Further advantageous embodiments of the present invention are indicated in the further description herein.

According to a first aspect, a method is provided for monitoring an actuator in a physical system. The method includes the following operations:

provision of a computer model that describes the actuator, the behavior of the actuator being represented by a computer model function and one or more parameters of the computer model function;

determining or adapting the values of the parameters of the computer model with the aid of one or more particular system quantities;

recognition of an error when a specified error condition is fulfilled, the error condition defining when at least one of the parameters and/or at least one quantity determined from a plurality of the parameters lies outside a corresponding specified target deviation range for the relevant parameter or the relevant quantity.

An aspect of the above method is to carry out a monitoring based on recognized deviations of one or more parameters of a computer model that are determined anew online, i.e. during running operation of the actuator system, in real time, regularly or at specified times. On the basis of recognized deviations of the one or plurality of parameters of the computer model from a specified target deviation range, creeping errors can be recognized that would not be recognized until later using previously known monitoring methods.

In addition, as a function of that at least one parameter, and/or as a function of that at least one quantity determined from a plurality of the parameters, whose values lie outside the target deviation range specified for the relevant parameter or for the relevant quantity determined from a plurality of the parameters, a specific component of the actuator allocated to the parameter or to the quantity is recognized as faulty.

According to a specific embodiment, the system quantities can be measured.

It can be provided that the computer model is determined through the discretization of a differential equation system that describes the actuator system. In particular, the computer model can be determined through discretization of the linear portion of the differential equation system that describes the actuator system, and through discretization of linear segments of the non-linear portion of the differential equation system that describes the actuator system.

According to a specific embodiment, the actuator can include an electromechanical throttle valve actuator for a throttle valve in an engine system having an internal combustion engine, the position of the throttle valve and/or an electric voltage applied to the electromechanical throttle valve actuator being specified as system quantities.

According to a further aspect, a device is provided for monitoring an actuator in a physical system, in particular a control device for operating the actuator system, the device being fashioned in order to:

provide a computer model that describes the actuator, the behavior of the actuator being modeled by a computer model function and by one or more parameters of the computer model function;

determine or adapt the values of the parameters of the computer model with the aid of one or more specified system quantities;

recognize an error when a specified error condition is not, the error condition defining when at least one of the parameters and/or at least one quantity determined from a plurality of the parameters lies outside a corresponding specified target deviation range for the relevant parameter or the relevant quantity.

According to a further aspect, an actuator system is provided having an actuator and having the above device.

According to a further aspect, a computer program is provided having a program code arrangement for carrying out all steps of the above method when the computer program is executed on a computer or on a corresponding computing unit, in particular in the above device.

According to a further aspect, a computer program product is provided that contains a program code that is stored on a computer-readable data carrier and that executes the above method when it is executed on a data processing device.

Specific embodiments of the present invention are explained in more detail below on the basis of the accompanying drawings.

DETAILED DESCRIPTION

Figure 1:
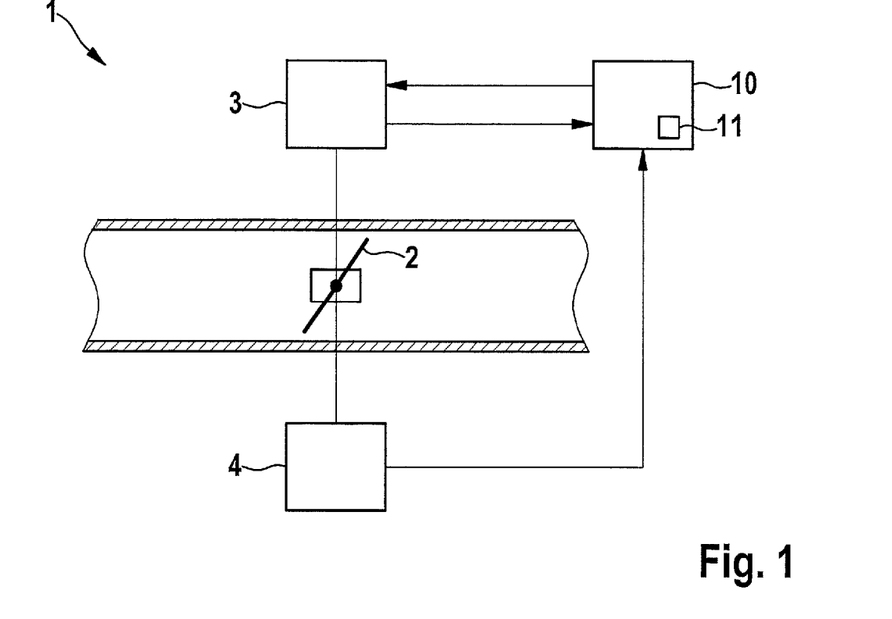
FIG. 1 shows a schematic representation of a throttle valve actuator as a physical system to be monitored.

FIG. 1 shows an actuator system 1 for adjusting the position of an actuating element 2. In the following, the method for monitoring actuator system 1 is described on the basis of a throttle valve actuator that can adjust a throttle valve as actuating element 2. However, it is also possible to apply the method described below to other actuator systems whose physical behavior is capable of being described by differential equations.

Actuating element 2 is moved using an actuator drive 3. Actuator drive 3 can be fashioned as an electromechanical actuator that can be fashioned for example as a direct-current motor, an electronically commutated motor, or a stepper motor. Actuator drive 3 can be supplied with electric current by a power source (not shown). Using a position sensor 4, the actual position assumed by actuating element 2 can be acquired and evaluated.

Actuator drive 3 is controlled using a control device 10 in order to reach a particular position of actuating element 2 through a suitable application of current. In order to carry out a position regulation for actuating element 2, control unit 10 receives from position sensor 4 a report concerning the actual position of actuating element 2. In addition, control unit 10 can receive an indication concerning an actuating moment, for example an indication of current via the current taken by actuator drive 3.

In particular given the use of an observer model for the position regulation, but also for the diagnosis of the position regulation, a computer model for physical actuator system 1 can be implemented in control unit 10. The actuating speed of actuator system 1 can also for example be calculated on the basis of a computer model if the position signal supplied by position sensor 4 has insufficient resolution for a differentiation. In addition, in particular for the operation of the overall system in sensitive ranges it can be necessary to carry out a monitoring of the functioning of actuator system 1 by carrying out a plausibilization of the functioning of actuator system 1 with the aid of the computer model that represents the actuator system.

For a modeling of above actuator system 1 having a direct-current motor as actuator drive 3, the following equations can be used:

$$U = RI + L\dot{I} + C_m K_{gear} \dot{\varphi}$$

$$J\frac{d\dot{\varphi}}{dt} = C_m K_{gear} I - M_s(\varphi) - M_f(\varphi) - A(p_{pre} - p_{post})$$

where R is a winding resistance of electromechanical actuator drive 3, L is an inductance of a winding of electromechanical actuator drive 3, I represents an actuator current through actuator drive 3, J represents a mass moment of inertia, and $C_m$ and $K_{gear}$ represent a gear ratio, all of which can be indicated or represented by the actuating moment as a function of actuator current I. In addition, U corresponds to the voltage applied to the electromechanical actuator drive of the actuator system, and $\phi$ represents the current position of actuating element 3.

Particular challenges for the modeling of a model equation that physically describes actuator system 1 as precisely as possible include in particular the description of the friction $M_f(\phi)$ and of the return moment $M_s(\phi)$ exerted by a return spring for actuating element 2, if the return spring has a non-linear characteristic.

The expression $A(p_{pre}-p_{post})$ describes a counter-pressure moment that is exerted by a pressure differential that exists over actuating element 2. In the case of a throttle valve having a centric suspension, this term can be assumed to be 0, because the acting pressure acts equally on the two halves of the throttle valve. Other disturbing moments can be additionally taken into account through addition of a specified $M_{stör}$.

In contrast to previous physical modelings of actuator systems, for the description of the friction an extensive friction model is used, for example a friction model according to Dahl, according to which:

$$M_f(\varphi) = \sigma_0 z + D\dot{\varphi}$$

$$\dot{z} = \dot{\varphi} - \frac{\sigma_0}{M_{coul}} z |\dot{\varphi}|$$

Here, $\sigma_0 z$ is a non-linear portion. Alternatively, a distinction could also be made between adhesive friction and sliding friction.

Figure 2:
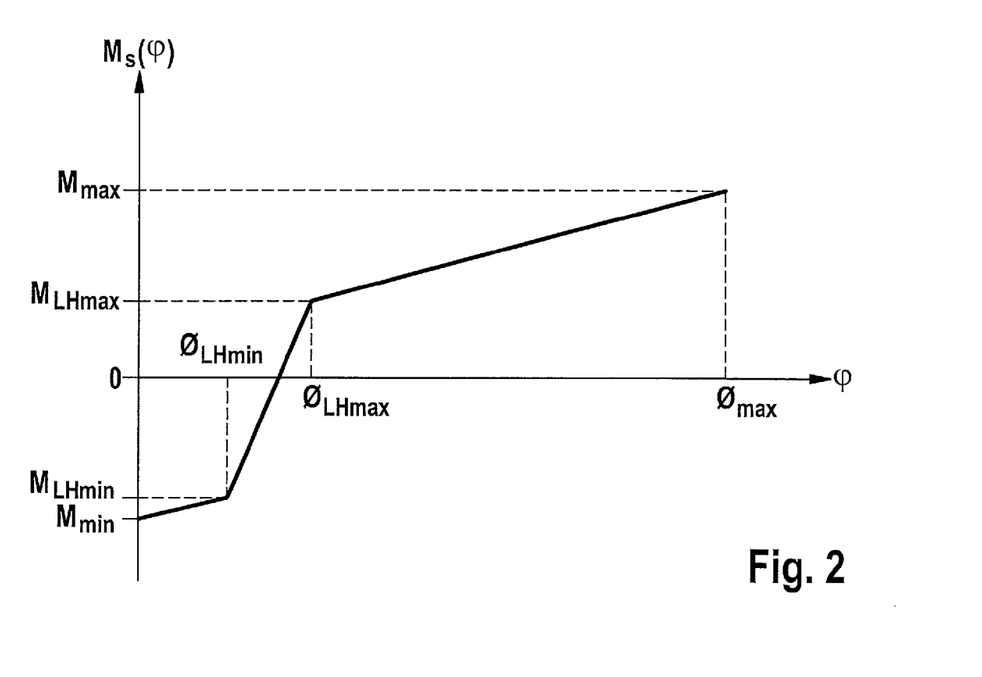
FIG. 2 shows a diagram illustrating a spring characteristic for a return spring of the actuator system of FIG. 1.

With regard to the return spring, it must be taken into account whether the return spring has a spring constant that is non-linear as a function of the deflection or position of actuating element 2. Typically, return springs in throttle devices are provided with an increased spring constant in the region of a zero position, in order to be able to ensure reliable return to a specific base position in the case of loss of a drive moment. At the zero position itself, however, the spring force is 0. The diagram of FIG. 2 shows an example of a curve of the spring constant, or of the characteristic of the return spring at actuating element 2. The following holds:

$$M_s(\phi) = M_{slin}(\phi) + M_{sNL}(\dot{\phi})$$

$$M_{slin}(\phi) = C_s \phi$$

where $M_{slin}(\phi)$ is the linear portion, $C_s$ is the slope of the linear portion of the spring characteristic, and $M_{sNL}(\phi)$ is the non-linear portion of the above differential equations describing the friction characteristic.

In the description of the above actuator system 1, both the friction model used and also the model of the return spring having a non-linear characteristic result in a non-linear differential equation system.

First, a method is described for the simplified solution of the non-linear differential equation system, making it possible to create a computer model that can be implemented in control device 10 for actuator system 1.

From the above equations, the following differential equation results:

$$U = \frac{LJ}{C_m K_{gear}}\dddot{\varphi} + \frac{RJ + LD}{C_m K_{gear}}\ddot{\varphi} + \left(C_m K_{gear} + \frac{RD + LC_s}{C_m K_{gear}}\right)\dot{\varphi} + \frac{RC_s}{C_m K_{gear}}\varphi + \frac{RM_{sNL}(\varphi)}{C_m K_{gear}} + \frac{RM_{fNL}(\dot{\varphi})}{C_m K_{gear}} + \frac{RA(p_{pre} - p_{post})}{C_m K_{gear}}$$

At the beginning of the method, the model described by the non-linear differential equation is divided into a linear portion and a non-linear portion.

A division into a linear portion U* and a non-linear portion $U_{nicht\_linear}$ according to $U=U^*+U_{nicht\_linear}$ results in:

$$U^* = U - \frac{RM_{sNL}(\varphi)}{C_m K_{gear}} - \frac{RM_{fNL}(\dot{\varphi})}{C_m K_{gear}} - \frac{RA(p_{pre} - p_{post})}{C_m K_{gear}}$$

-continued $$U^* = \frac{LJ}{C_m K_{gear}}\dddot{\varphi} + \frac{RJ + LD}{C_m K_{gear}}\ddot{\varphi} + \left(C_m K_{gear} + \frac{RD + LC_s}{C_m K_{gear}}\right)\dot{\varphi} + \frac{RC_s}{C_m K_{gear}}\varphi$$

The non-linear portion is then:

$$U_{nicht\_linear} = -\frac{RM_{s_{NL}}(\varphi)}{C_m K_{gear}} - \frac{RM_{f_{NL}}(\dot{\varphi})}{C_m K_{gear}} - \frac{RA(p_{pre} - p_{post})}{C_m K_{gear}}$$

Subsequently, the linear part of the differential equation is now discretized according to a discretization method. This can be carried out using the Tustin method. The Tustin conversion is based on a Laplace transformation and a transformation corresponding to $$s \leftarrow \frac{2}{dT}\frac{z-1}{z+1}$$

From the linear differential equation, after the Laplace transformation there results:

$$\frac{\Phi(s)}{U^*(s)} = \frac{1}{\frac{LJ}{C_m K_{gear}}s^3 + \frac{RJ + LD}{C_m K_{gear}}s^2 + \left(C_m K_{gear} + \frac{RD + LC_s}{C_m K_{gear}}\right)s + \frac{RC_s}{C_m K_{gear}}}$$

Simplifying:

$$G(s) = \frac{1}{as^3 + bs^2 + cs + d}$$

with $$a = \frac{LJ}{C_m K_{gear}}$$

$$b = \frac{RJ + LD}{C_m K_{gear}}$$

$$c = C_m K_{gear} + \frac{RD + LC_s}{C_m K_{gear}}$$

$$d = \frac{RC_s}{C_m K_{gear}}$$

From this there results, according to the Tustin conversion with $$s \leftarrow \frac{2}{dT}\frac{z-1}{z+1}$$

$$G(z) = \frac{\alpha + 3\alpha z^{-1} + 3\alpha z^{-2} + \alpha z^{-3}}{1 + \beta z^{-1} + \gamma z^{-2} + \delta z^{-3}}$$

where $\{\alpha, \beta, \gamma, \delta\} = f(a, b, c, d, dT)$ with $$a_1 = \frac{8a}{dT^3}$$

$$b_1 = \frac{4b}{dT^2}$$

$$c_1 = \frac{2c}{dT}$$

-continued $$\alpha = \frac{1}{a_1 + b_1 + c_1 + d}$$

$$\beta = \alpha(-3a_1 - b_1 + c_1 + 3d)$$

$$\gamma = \alpha(3a_1 - b_1 - c_1 + 3d)$$

$$\delta = -\gamma - \beta - 1 + 8\alpha d$$

The above computer model includes the computer model function $$G(z) = \frac{\Phi(z)}{U^*(z)}$$

with parameters $\alpha, \beta, \gamma, \delta$.

The Tustin discretization has the advantage that it results in computer models having simple computing rules that can easily be computed using microprocessors having a comparatively small computing capacity. In particular, the discretized computer model does not contain any exponential equations or any other complex mathematical functions.

However, the Tustin discretization privileges the discretization results that can be compensated in order to improve the results. The compensation can be carried out by providing an approximated delay of dT/2, corresponding to:

$$H(z) = \frac{z+1}{2z} = \frac{1+z^{-1}}{2}$$

The following holds:

$$U^* = U - \frac{RM_{s_{NL}}(\varphi)}{C_m K_{gear}} - \frac{RM_{f_{NL}}(\dot{\varphi})}{C_m K_{gear}} - \frac{RA(p_{pre} - p_{post})}{C_m K_{gear}}$$

$$u_1(t_k) = U^*(t_k) + 3U^*(t_{k-1}) + 3U^*(t_{k-2}) + U^*(t_{k-3})$$

$$\tilde{u}(t_k) = \frac{u_1(t_k) + u_1(t_{k-1})}{2}$$

$$\varphi(t_k) = \alpha\tilde{u}(t_k) - \beta\varphi(t_{k-1}) - \gamma\varphi(t_{k-2}) - \delta\varphi(t_{k-3})$$

Initial conditions are:

If $|\dot{\phi}(t_k)| \geq \dot{\phi}_{coul}$ then $M_{f_{NL}}(\dot{\phi}(t_k)) = M_{coul}\text{sign}(\dot{\phi})$, and if $\phi(t_k) \geq \phi_{LH\ max}$ and $\phi(t_k) < \phi_{max}$ then $M_{s_{NL}}(\phi(t_k)) = M_0$ These simplify the above equations, resulting in:

$$u^* = u(t_k) - \frac{RM_0}{C_m K_{gear}} - \frac{RM_{coul}}{C_m K_{gear}}\text{sign}(\dot{\varphi}) - \frac{RA(p_{pre} - p_{post})}{C_m K_{gear}}$$

$$u_1(t_k) = u^*(t_k) + 3u^*(t_{k-1}) + 3u^*(t_{k-2}) + u^*(t_{k-3})$$

$$\tilde{u}(t_k) = \frac{u_1(t_k) + u_1(t_{k-1})}{2}$$

$$\varphi(t_k) = \alpha\tilde{u}(t_k) - \beta\varphi(t_{k-1}) - \gamma\varphi(t_{k-2}) - \delta\varphi(t_{k-3})$$

$$u^*(t_k) = u(t_k) - \frac{\eta}{8\alpha} - \frac{\mu}{\alpha}\cdot v_2(t_k) - \frac{\kappa}{\alpha}v_1(t_k)$$

$$\tilde{u}_1(t_k) = \frac{u^*(t_k) + 4u^*(t_{k-1}) + 6u^*(t_{k-2}) + 4u^*(t_{k-3}) + u^*(t_{k-4})}{2}$$

$$\varphi(t_k) = \alpha\tilde{u}_1(t_k) - \beta\varphi(t_{k-1}) - \gamma\varphi(t_{k-2}) - \delta\varphi(t_{k-3})$$

with $$v_1(t_k) = A(p_{pre} - p_{post})$$

$$v_2(t_k) = \text{sign}(\dot{\varphi})$$

$$\rho = \frac{\alpha R}{C_m K_{gear}}$$

$$\mu = \rho M_{coul}$$

$$\eta = 8\rho M_0$$

$$\kappa = \rho A$$

$$\tilde{u}(t_k) = \frac{u^{\square}(t_k) + 4u(t_{k-1}) + 6u(t_{k-2}) + 4u(t_{k-3}) + u(t_{k-4})}{2}$$

$$\tilde{v}_1(t_k) = \frac{v_1(t_k) + 4v_1(t_{k-1}) + 6v_1(t_{k-2}) + 4v_1(t_{k-3}) + v_1(t_{k-4})}{2}$$

$$\tilde{v}_2(t_k) = \frac{v_2(t_k) + 4v_2(t_{k-1}) + 6v_2(t_{k-2}) + 4v_2(t_{k-3}) + v_2(t_{k-4})}{2}$$

$$\varphi(t_k) = \alpha\tilde{u}(t_k) - \mu\tilde{v}_2(t_k) - \kappa\tilde{v}_1(t_k) - \beta\varphi(t_{k-1}) - \gamma\varphi(t_{k-2}) - \delta\varphi(t_{k-3}) - \eta$$

The above creation of a computer model for the linear portion of the differential equation that describes the throttle valve actuator results in seven parameters $\alpha$, $\mu$, $\kappa$, $\beta$, $\gamma$, $\delta$, $\eta$ that can be determined regularly at specified intervals or during each computing cycle. The parameters may even be determined and updated in real time.

Figure 3:
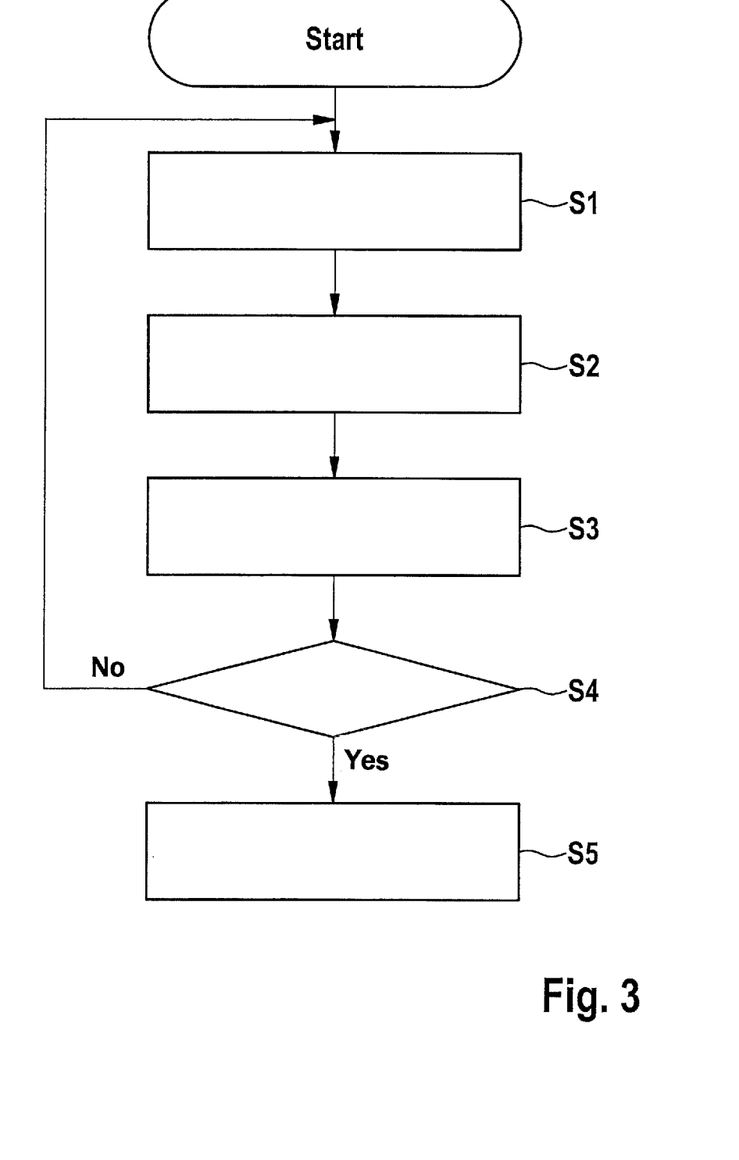
FIG. 3 shows a flow diagram illustrating a method for monitoring the throttle valve actuator with the aid of a modeled computer model.

As described in connection with the flow diagram shown in FIG. 3, the functioning of the actuator system is monitored on the basis of the parameters $\alpha$, $\mu$, $\kappa$, $\beta$, $\gamma$, $\delta$, $\eta$.

The above computer model is stored in a control device for operating the throttle valve actuator, and the above parameters $\alpha$, $\mu$, $\kappa$, $\beta$, $\gamma$, $\delta$, $\eta$ are cyclically calculated during running operation of the throttle valve actuator (step S1). The parameters $\alpha$, $\mu$, $\kappa$, $\beta$, $\gamma$, $\delta$, $\eta$ can be determined for example by applying a recursive method (a recursive least square method or a gradient method).

In step S2, the curve of the individual parameters $\alpha$, $\mu$, $\kappa$, $\beta$, $\gamma$, $\delta$, $\eta$ can be plotted, and in a subsequent step S3 error conditions can be provided that for particular types of errors identify those parameters or parameter combinations for which the occurrence of the particular type of error can be recognized. In other words, via the deviation of one or more parameters, allocated to the error type, from specified target deviation ranges $S(\alpha, \mu, \kappa, \beta, \gamma, \delta, \eta)+/-\Delta(\alpha, \mu, \kappa, \beta, \gamma, \delta, \eta)$, or $S \pm \Delta$ for short, the error determined by the error type can be inferred.

The following table defines, for the above actuator system, the error conditions on the basis of which the presence of a particular error can be identified.

| Error condition | Error type |
|---|---|
| $\alpha > S(\alpha) + \Delta\alpha$ & $\eta/\alpha < S(\eta/\alpha) - \Delta(\eta/\alpha)$ | Spring broken/missing ($C_s = 0$, M0 = 0) or resistance too low, short circuit or motor too weak, defective permanent magnets; |
| $S(\alpha) - \Delta\alpha < \alpha < S(\alpha) + \Delta\alpha$ & $\mu/\alpha > S(\mu/\alpha) + \Delta(\mu/\alpha)$ & $S(\eta/\alpha) - \Delta(\eta/\alpha) < \eta/\alpha < S(\eta/\alpha) + \Delta(\eta/\alpha)$ | Friction too high, e.g. due to contamination, stiffness |
| $S(\alpha) - \Delta\alpha < \alpha < S(\alpha) + \Delta\alpha$ & $\mu/\alpha < S(\mu/\alpha) - \Delta(\mu/\alpha)$ & $S(\eta/\alpha) - \Delta(\eta/\alpha) < \eta/\alpha < S(\eta/\alpha) + \Delta(\eta/\alpha)$ | Friction too low, wear, shaft seal missing, coupling bar broken |

-continued

| Error condition | Error type |
|---|---|
| $\eta/\alpha > S(\eta/\alpha) + \Delta(\eta/\alpha)$ v ($\alpha < S(\alpha) - \Delta\alpha$ & $\mu/\alpha > S(\mu/\alpha) + \Delta(\mu/\alpha)$) $\alpha > S(\alpha) + \Delta\alpha$ & $\mu/\alpha < S(\mu/\alpha) - \Delta(\mu/\alpha)$ | Too-high resistance (e.g. due to too-high temperature) Resistance too low, short-circuit (R too low) or motor too weak, e.g. due to defective permanent magnets |

A target deviation range $S+/-\Delta$ can be provided for each of the parameters. The target deviation ranges of the parameters can be fixedly specified. If a target value S of the relevant parameter $\alpha$, $\mu$, $\kappa$, $\beta$, $\gamma$, $\delta$, $\eta$ is specified, the corresponding target deviation range $S+/-\Delta$ can be determined relatively or absolutely using a corresponding tolerance indication $+/-\Delta$. Alternatively or in addition, target deviation ranges $S+/-\Delta$ can be derived from last-acquired values, stored in a storage unit 11 of control device 10, of each of parameters $\alpha$, $\mu$, $\kappa$, $\beta$, $\gamma$, $\delta$, $\eta$, in particular using a mean value formation. In addition, target deviation range $S+/-\Delta$ for one of the parameters can also be determined as a function of the relevant parameter and/or as a function of one or more of the other parameters $\alpha$, $\mu$, $\kappa$, $\beta$, $\gamma$, $\delta$, $\eta$.

In addition, target deviation ranges of quantities formed from a plurality of parameters can also be determined, such as $S(\mu/\alpha)+/-\Delta(\mu/\alpha)$ for $(\mu/\alpha)$, or $S(\eta/\alpha)+/-\Delta(\eta/\alpha)$ for $(\eta/\alpha)$.

In a query step S4, the presence of error conditions for particular defined error types is queried. If in query step S4 it is determined that one or more of the specified error conditions is fulfilled (alternative: yes), then in step S5 the allocated error types are determined according to the fulfilled error conditions, e.g. using an allocation table that assigns the error conditions to the error types.

Otherwise (alternative: no), a jump back to step S1 takes place. In addition, it can be provided that the occurrence of an error is always signaled when the value of a parameter, or of a quantity determined by a plurality of parameters lies, outside a correspondingly defined target deviation range.

The sensitivity of the above method can be defined through the selection of the magnitude of the respective tolerance indication $\Delta(\alpha, \mu, \kappa, \beta, \gamma, \delta, \eta)$.

In particular in the case of the above throttle valve actuator, up to now it has been provided to check the return spring before each engine start. The test required for this is time-consuming and delays the full operational capacity of the system in which the throttle valve actuator is installed. This test can be omitted if the spring constant is determined and checked online and regularly during operation, using the above method.

What is claimed is:
1. A method for monitoring an actuator in a physical system, the method comprising:
monitoring, based on measured system quantities, the actuator, via a processor having a computer model that describes the actuator, the behavior of the actuator being represented by a computer model function and one or more parameters of the computer model function;
determining or adapting values of the parameters of the computer model with the aid of one or more particular system quantities;
determining an error when a specified error condition is fulfilled, the error condition defining when at least one of the parameters, and/or at least one quantity determined from a plurality of the parameters, lies outside a corresponding specified target deviation range for a relevant parameter or the relevant quantity; and
determining that a component of the actuator is faulty if the error is determined;
wherein the actuator includes an electromechanical throttle valve actuator for a throttle valve in an engine system having an internal combustion engine, the position of the throttle valve and/or an electric voltage applied to the electromechanical throttle valve actuator being specified as the system quantities, and
wherein for the actuator, the error condition on the basis of which a particular error can be identified include at least one of the following error types: (i) an actuator spring is broken and/or missing, and/or a low resistance, and/or a short-circuit, and/or a weak motor, and/or defective permanent magnets; (ii) an actuator friction is too high due to contamination and/or stiffness; (iii) an actuator friction is too low due to wear, missing shaft sealant, and/or a broken coupling bar; (iv) an actuator component has a high resistance; and (v) the actuator component has a low resistance due to a short circuit, a weak motor, and/or defective permanent magnets, and
wherein error types (i) correspond to the following error condition:

$\alpha > S(\alpha) + \Delta\alpha \& \eta/\alpha < S(\eta/\alpha) - \Delta(\eta/\alpha)$, wherein error types (ii) correspond to the following error conditions:

$S(\alpha) - \Delta\alpha < \alpha < S(\alpha) + \Delta\alpha \&$ $\mu/\alpha > S(\mu/\alpha) + \Delta(\mu/\alpha) \&$ $S(\eta/\alpha) - \Delta(\eta/\alpha) < \eta/\alpha < S(\eta/\alpha) + \Delta(\eta/\alpha)$, wherein error types (iii) correspond to the following error conditions:

$S(\alpha) - \Delta\alpha < \alpha < S(\alpha) + \Delta\alpha \&$ $\mu/\alpha < S(\mu/\alpha) - \Delta(\mu/\alpha) \&$ $S(\eta/\alpha) - \Delta(\eta/\alpha) < \eta/\alpha < S(\eta/\alpha) + \Delta(\eta/\alpha)$, wherein error types (iv) correspond to the following error conditions:

$\eta/\alpha > S(\eta/\alpha) + \Delta(\eta/\alpha) \vee$ $(\alpha < S(\alpha) - \Delta\alpha \&$ $\mu/\alpha > S(\mu/\alpha) + \Delta(\mu/\alpha)$, and wherein error types (v) correspond to the following error conditions:

$\alpha > S(\alpha) + \Delta\alpha \&$ $\mu/\alpha < S(\mu/\alpha) - \Delta(\mu/\alpha)$, where R is a winding resistance of an actuator drive of the actuator, L is an inductance of a winding of the actuator drive, I represents an actuator current through the actuator drive, J represents a mass moment of inertia, and $C_m$ and $K_{gear}$ represent a gear ratio, $$a = \frac{LJ}{C_m K_{gear}}$$

$$b = \frac{RJ + LD}{C_m K_{gear}}$$

-continued $$c = C_m K_{gear} + \frac{RD + LC_s}{C_m K_{gear}}$$

$$d = \frac{RC_s}{C_m K_{gear}}$$

$$a_1 = \frac{8a}{dT^3}$$

$$b_1 = \frac{4b}{dT^2}$$

$$c_1 = \frac{2c}{dT}$$

$$\alpha = \frac{1}{a_1 + b_1 + c_1 + d}$$

$$\beta = \alpha(-3a_1 - b_1 + c_1 + 3d)$$

$$\gamma = \alpha(3a_1 - b_1 - c_1 + 3d)$$

$$\delta = -\gamma - \beta - 1 + 8\alpha d,$$

and where
$M_f(\dot\phi)$ is a friction moment and $M_s(\phi)$ is a return moment of an actuating element of the actuator, where $A(p_{pre} - p_{post})$ is a counter-pressure moment that is exerted by a pressure differential that exists over the actuating element, and where $$\rho = \frac{\alpha R}{C_m K_{gear}}$$

$$\mu = \rho M_{coul}$$

$$\eta = 8\rho M_0$$

$$\kappa = \rho A.$$

2. The method of claim 1, wherein, as a function of the relevant parameter, and/or as a function of that at least one quantity determined from a plurality of the parameters, whose values lie outside the target deviation range specified for the relevant parameter or for the relevant quantity determined from a plurality of the parameters, a particular component of the actuator allocated to the parameter or to the quantity is recognized as faulty.

3. The method of claim 1, wherein the computer model is determined through discretization of a differential equation system that describes the physical system having the actuator.

4. The method of claim 3, wherein the computer model is determined through discretization of the linear portion of a differential equation system that describes the actuator system, and through discretization of linear segments of the non-linear portion of the differential equation system that describes the actuator system.

5. The method of claim 1, wherein the computer model is solved through an iterative method, in real time, so as to obtain the parameters.

6. The method of claim 1, wherein the computer model for a linear portion of a differential equation that describes the throttle valve actuator uses parameters that can be determined regularly at specified intervals or during each computing cycle, and wherein the computer model includes a Tustin conversion.

7. A device for monitoring an actuator in a physical system, which includes a control device for operating the physical system having the actuator, comprising:
- a monitoring arrangement to monitor, based on measured system quantities, the actuator, via a processor having a computer model that describes the actuator, the behavior of the actuator being represented by a computer model function and one or more parameters of the computer model function;
- wherein the monitoring arrangement is configured to determine or adapt values of the parameters of the computer model with the aid of one or more particular system quantities,
- wherein the monitoring arrangement is configured to determine an error when a specified error condition is fulfilled, the error condition defining when at least one of the parameters, and/or at least one quantity determined from a plurality of the parameters, lies outside a corresponding specified target deviation range for a relevant parameter or the relevant quantity,
- wherein the monitoring arrangement is configured to determine that a component of the actuator is faulty if the error is determined,
- wherein the actuator includes an electromechanical throttle valve actuator for a throttle valve in an engine system having an internal combustion engine, the position of the throttle valve and/or an electric voltage applied to the electromechanical throttle valve actuator being specified as the system quantities, and
- wherein for the actuator, the error condition on the basis of which a particular error can be identified include at least one of the following error types: (i) an actuator spring is broken and/or missing, and/or a low resistance, and/or a short-circuit, and/or a weak motor, and/or defective permanent magnets; (ii) an actuator friction is too high due to contamination and/or stiffness; (iii) an actuator friction is too low due to wear, missing shaft sealant, and/or a broken coupling bar; (iv) an actuator component has a high resistance; and (v) the actuator component has a low resistance due to a short circuit, a weak motor, and/or defective permanent magnets, and
- wherein error types (i) correspond to the following error condition:

$\alpha > S(\alpha) + \Delta\alpha \& \eta/\alpha < S(\eta/\alpha) - \Delta(\eta/\alpha)$, wherein error types (ii) correspond to the following error conditions:

$S(\alpha) - \Delta\alpha < \alpha < S(\alpha) + \Delta\alpha \&$ $\mu/\alpha > S(\mu/\alpha) + \Delta(\mu/\alpha) \&$ $S(\eta/\alpha) - \Delta(\eta/\alpha) < \eta/\alpha < S(\eta/\alpha) + \Delta(\eta/\alpha)$, wherein error types (iii) correspond to the following error conditions:

$S(\alpha) - \Delta\alpha < \alpha < S(\alpha) + \Delta\alpha \&$ $\mu/\alpha < S(\mu/\alpha) - \Delta(\mu/\alpha) \&$ $S(\eta/\alpha) - \Delta(\eta/\alpha) < \eta/\alpha < S(\eta/\alpha) + \Delta(\eta/\alpha)$, wherein error types (iv) correspond to the following error conditions:

$\eta/\alpha > S(\eta/\alpha) + \Delta(\eta/\alpha) \vee$ $(\alpha < S(\alpha) - \Delta\alpha \&$ $\mu/\alpha > S(\mu/\alpha) + \Delta(\mu/\alpha)$, and wherein error types (v) correspond to the following error conditions:

$\alpha > S(\alpha) + \Delta\alpha \&$ $\mu/\alpha < S(\mu/\alpha) - \Delta(\mu/\alpha)$, where R is a winding resistance of an actuator drive of the actuator, L is an inductance of a winding of the actuator drive, I represents an actuator current through the actuator drive, J represents a mass moment of inertia, and $C_m$ and $K_{gear}$ represent a gear ratio, $$a = \frac{LJ}{C_m K_{gear}}$$

$$b = \frac{RJ + LD}{C_m K_{gear}}$$

$$c = C_m K_{gear} + \frac{RD + LC_s}{C_m K_{gear}}$$

$$d = \frac{RC_s}{C_m K_{gear}},$$

$$a_1 = \frac{8a}{dT^3}$$

$$b_1 = \frac{4b}{dT^2}$$

$$c_1 = \frac{2c}{dT}$$

$$\alpha = \frac{1}{a_1 + b_1 + c_1 + d}$$

$$\beta = \alpha(-3a_1 - b_1 + c_1 + 3d)$$

$$\gamma = \alpha(3a_1 - b_1 - c_1 + 3d)$$

$$\delta = -\gamma - \beta - 1 + 8\alpha d,$$

and where
$M_f(\phi)$ is a friction moment and $M_s(\phi)$ is a return moment of an actuating element of the actuator, where $A(p_{pre} - p_{post})$ is a counter-pressure moment that is exerted by a pressure differential that exists over the actuating element, and where $$\rho = \frac{\alpha R}{C_m K_{gear}}$$

$$\mu = \rho M_{coul}$$

$$\eta = 8\rho M_0$$

$$\kappa = \rho A.$$

8. The device of claim 7, wherein the computer model for a linear portion of a differential equation that describes the throttle valve actuator uses parameters that can be determined regularly at specified intervals or during each computing cycle, and wherein the computer model includes a Tustin conversion.

9. An actuator system, comprising:
- an actuator; and
- a device for monitoring an actuator in a physical system, which includes a control device for operating the physical system having the actuator, including:
  - a monitoring arrangement to monitor, based on measured system quantities, the actuator, via a processor having a computer model that describes the actuator, the behavior of the actuator being represented by a computer model function and one or more parameters of the computer model function;

wherein the monitoring arrangement is configured to determine or adapt values of the parameters of the computer model with the aid of one or more particular system quantities, wherein the monitoring arrangement is configured to determine an error when a specified error condition is fulfilled, the error condition defining when at least one of the parameters, and/or at least one quantity determined from a plurality of the parameters, lies outside a corresponding specified target deviation range for a relevant parameter or the relevant quantity, wherein the monitoring arrangement is configured to determine that a component of the actuator is faulty if the error is determined, and wherein the actuator includes an electromechanical throttle valve actuator for a throttle valve in an engine system having an internal combustion engine, the position of the throttle valve and/or an electric voltage applied to the electromechanical throttle valve actuator being specified as the system quantities, and wherein for the actuator, the error condition on the basis of which a particular error can be identified include at least one of the following error types: (i) an actuator spring is broken and/or missing, and/or a low resistance, and/or a short-circuit, and/or a weak motor, and/or defective permanent magnets: (ii) an actuator friction is too high due to contamination and/or stiffness; (iii) an actuator friction is too low due to wear, missing shaft sealant, and/or a broken coupling bar; (iv) an actuator component has a high resistance; and (v) the actuator component has a low resistance due to a short circuit, a weak motor, and/or defective permanent magnets, and wherein error types (i) correspond to the following error condition:

α>S(α)+Δα&η/α<S(η/α)−Δ(η/α), wherein error types (ii) correspond to the following error conditions:

S(α)−Δα<α<S(α)+Δα&

μ/α>S(μ/α)+Δ(μ/α)&

S(η/α)−Δ(η/α)<η/α<S(η/α)+Δ(η/α), wherein error types (iii) correspond to the following error conditions:

S(α)−Δα<α<S(α)+Δα&

μ/α<S(μ/α)−Δ(μ/α)&

S(η/α)−Δ(η/α)<η/α<S(η/α)+Δ(η/α), wherein error types (iv) correspond to the following error conditions:

η/α>S(η/α)+Δ(η/α)∨

(α<S(α)−Δα&

μ/α>S(μ/α)+Δ(μ/α), and wherein error types (v) correspond to the following error conditions:

α>S(α)+Δα&

μ/α<S(μ/α)−Δ(μ/α), where R is a winding resistance of an actuator drive of the actuator, L is an inductance of a winding of the actuator drive, I represents an actuator current through the actuator drive, J represents a mass moment of inertia, and $C_m$ and $K_{gear}$ represent a gear ratio, $$a = \frac{LJ}{C_m K_{gear}}$$

$$b = \frac{RJ + LD}{C_m K_{gear}}$$

$$c = C_m K_{gear} + \frac{RD + LC_s}{C_m K_{gear}}$$

$$d = \frac{RC_s}{C_m K_{gear}}$$

$$a_1 = \frac{8a}{dT^3}$$

$$b_1 = \frac{4b}{dT^2}$$

$$c_1 = \frac{2c}{dT}$$

$$\alpha = \frac{1}{a_1 + b_1 + c_1 + d}$$

$$\beta = \alpha(-3a_1 - b_1 + c_1 + 3d)$$

$$\gamma = \alpha(3a_1 - b_1 - c_1 + 3d)$$

$$\delta = -\gamma - \beta - 1 + 8\alpha d,$$

and where $M_f(\phi)$ is a friction moment and $M_s(\phi)$ is a return moment of an actuating element of the actuator, where $A(p_{pre} - p_{post})$ is a counter-pressure moment that is exerted by a pressure differential that exists over the actuating element, and where $$\rho = \frac{\alpha R}{C_m K_{gear}}$$

$$\mu = \rho M_{coul}$$

$$\eta = 8\rho M_0$$

$$\kappa = \rho A.$$

10. The actuator system of claim 9, wherein the computer model for a linear portion of a differential equation that describes the throttle valve actuator uses parameters that can be determined regularly at specified intervals or during each computing cycle, and wherein the computer model includes a Tustin conversion.

11. A non-transitory computer readable medium having a computer program, which is executable by a processor, comprising:

a program code arrangement having program code for monitoring an actuator in a physical system, by performing the following:

monitoring, based on measured system quantities, the actuator, via a processor having a computer model that describes the actuator, the behavior of the actuator being represented by a computer model function and one or more parameters of the computer model function;

determining or adapting values of the parameters of the computer model with the aid of one or more particular system quantities;

determining an error when a specified error condition is fulfilled, the error condition defining when at least one of the parameters, and/or at least one quantity determined from a plurality of the parameters, lies outside a corresponding specified target deviation range for a relevant parameter or the relevant quantity; and determining that a component of the actuator is faulty if the error is determined;

wherein the actuator includes an electromechanical throttle valve actuator for a throttle valve in an engine system having an internal combustion engine, the position of the throttle valve and/or an electric voltage applied to the electromechanical throttle valve actuator being specified as the system quantities, and wherein for the actuator, the error condition on the basis of which a particular error can be identified include at least one of the following error types: (i) an actuator spring is broken and/or missing, and/or a low resistance, and/or a short-circuit, and/or a weak motor, and/or defective permanent magnets: (ii) an actuator friction is too high due to contamination and/or stiffness: (iii) an actuator friction is too low due to wear, missing shaft sealant, and/or a broken coupling bar: (iv) an actuator component has a high resistance; and (v) the actuator component has a low resistance due to a short circuit, a weak motor, and/or defective permanent magnets, and wherein error types (i) correspond to the following error condition:

$\alpha > S(\alpha) + \Delta\alpha \& \eta/\alpha < S(\eta/\alpha) - \Delta(\eta/\alpha)$, wherein error types (ii) correspond to the following error conditions:

$S(\alpha) - \Delta\alpha < \alpha < S(\alpha) + \Delta\alpha \&$ $\mu/\alpha > S(\mu/\alpha) + \Delta(\mu/\alpha) \&$ $S(\eta/\alpha) - \Delta(\eta/\alpha) < \eta/\alpha < S(\eta/\alpha) + \Delta(\eta/\alpha)$, wherein error types (iii) correspond to the following error conditions:

$S(\alpha) - \Delta\alpha < \alpha < S(\alpha) + \Delta\alpha \&$ $\mu/\alpha < S(\mu/\alpha) - \Delta(\mu/\alpha) \&$ $S(\eta/\alpha) - \Delta(\eta/\alpha) < \eta/\alpha < S(\eta/\alpha) + \Delta(\eta/\alpha)$, wherein error types (iv) correspond to the following error conditions:

$\eta/\alpha > S(\eta/\alpha) + \Delta(\eta/\alpha)$ ∨

$(\alpha < S(\alpha) - \Delta\alpha \&$ $\mu/\alpha > S(\mu/\alpha) + \Delta(\mu/\alpha)$, and wherein error types (v) correspond to the following error conditions:

$\alpha > S(\alpha) + \Delta\alpha \&$ $\mu/\alpha < S(\mu/\alpha) - \Delta(\mu/\alpha)$, where R is a winding resistance of an actuator drive of the actuator, L is an inductance of a winding of the actuator drive, I represents an actuator current through the actuator drive, J represents a mass moment of inertia, and $C_m$ and $K_{gear}$ represent a gear ratio, and where $a = \dfrac{LJ}{C_m K_{gear}}$ $b = \dfrac{RJ + LD}{C_m K_{gear}}$ $c = C_m K_{gear} + \dfrac{RD + LC_s}{C_m K_{gear}}$ $d = \dfrac{RC_s}{C_m K_{gear}}$ $a_1 = \dfrac{8a}{dT^3}$ $b_1 = \dfrac{4b}{dT^2}$ $c_1 = \dfrac{2c}{dT}$ $\alpha = \dfrac{1}{a_1 + b_1 + c_1 + d}$ $\beta = \alpha(-3a_1 - b_1 + c_1 + 3d)$ $\gamma = \alpha(3a_1 - b_1 - c_1 + 3d)$ $\delta = -\gamma - \beta - 1 + 8\alpha d,$ and where $M_f(\phi)$ is a friction moment and $M_s(\phi)$ is a return moment of an actuating element of the actuator, where $A(p_{pre} - p_{post})$ is a counter-pressure moment that is exerted by a pressure differential that exists over the actuating element, and where $\rho = \dfrac{\alpha R}{C_m K_{gear}}$ $\mu = \rho M_{coul}$ $\eta = 8\rho M_0$ $\kappa = \rho A.$ 12. The computer readable medium of claim 11, wherein, as a function of that at least one parameter, and/or as a function of that at least one quantity determined from a plurality of the parameters, whose values lie outside the target deviation range specified for the relevant parameter or for the relevant quantity determined from a plurality of the parameters, a particular component of the actuator allocated to the parameter or to the quantity is recognized as faulty.

13. The computer readable medium of claim 11, wherein the computer model is determined through discretization of a differential equation system that describes the actuator system.

14. The computer readable medium of claim 13, wherein the computer model is determined through discretization of the linear portion of the differential equation system that describes the actuator system, and through discretization of linear segments of the non-linear portion of the differential equation system that describes the actuator system.

15. The computer readable medium of claim 11, wherein the computer model is solved through an iterative method, in real time, so as to obtain the parameters.

16. The computer readable medium of claim 11, wherein the computer model for a linear portion of a differential equation that describes the throttle valve actuator uses parameters that can be determined regularly at specified intervals or during each computing cycle, and wherein the computer model includes a Tustin conversion.

* * * * *